(12) United States Patent
Hall (10) Patent No.: US 10,846,647 B2
(45) Date of Patent: Nov. 24, 2020

(54) APPARATUS FOR NOTIFYING A PARCEL IS DELIVERED

(71) Applicant: HALL LABS LLC, Provo, UT (US)

(72) Inventor: David R. Hall, Provo, UT (US)

(73) Assignee: Hall Labs LLC, Provo, UT (US)

(*) Notice: Subject to any disclaimer, the term of this patent is extended or adjusted under 35 U.S.C. 154(b) by 519 days.

(21) Appl. No.: 15/426,365

(22) Filed: Feb. 7, 2017

(65) Prior Publication Data

US 2018/0225626 A1    Aug. 9, 2018

(51) Int. Cl.
*G06Q 10/08* (2012.01)

(52) U.S. Cl.
CPC ............................... *G06Q 10/0833* (2013.01)

(58) Field of Classification Search
CPC ................................................. G06Q 10/0833
See application file for complete search history.

(56) References Cited

U.S. PATENT DOCUMENTS

| | | | |
|---|---|---|---|
| 2012/0165984 A1* | 6/2012 | Kang | B25J 5/00 700/259 |
| 2016/0068264 A1* | 3/2016 | Ganesh | G08G 5/0069 701/2 |
| 2017/0225334 A1* | 8/2017 | Deyle | G08B 13/196 |
| 2017/0294110 A1* | 10/2017 | Atchley | G08B 25/12 |
| 2017/0309142 A1* | 10/2017 | Phillips | G08B 7/066 |

OTHER PUBLICATIONS

Sachdeva, Sam, "Are pizza delivery robots future or fad?," The Press, Christchurch, New Zealand, Fairfax Media, Fairfax New Zealand Limited, Mar. 21, 2016, A.6.*

* cited by examiner

*Primary Examiner* — Nathan Erb (57) ABSTRACT

An apparatus for notifying of parcel delivery comprising an aerial parcel delivery apparatus, landing gear, a processor, a number of visual sensors, and an articulated robotic arm. The robotic arm may comprise an end effector comprising one or more simulated fingers or digits of a human hand, a protruding member, and a wireless communication adapter. The end effector may have the ability to grasp an object or actuate a doorbell, key pay, or an alarm system. The articulated robotic arm including a protruding member is extended to ring a doorbell.

18 Claims, 6 Drawing Sheets

APPARATUS FOR NOTIFYING A PARCEL IS DELIVERED

TECHNICAL FIELD

The disclosure relates generally to the field of parcel delivery. Specifically, the disclosure relates to the delivery of a parcel to a destination.

BACKGROUND

The Internet and other technological changes have brought about sweeping changes in communications and commerce. While overnight parcel delivery services have become commonplace in recent years (for example, Federal Express, United Parcel Service, and Airborne), these services have great difficulty delivering to individual homes. The occupant of the home is often not aware of the parcel delivery. Often, a parcel delivery person will leave a parcel unattended. An unattended parcel may be stolen, causing inconvenience for the occupant and cost for the retailer.

Security of parcels and parcel theft has become a challenge for both retailers and consumers. Parcel theft harms many members of society and increases the cost of merchandise.

BRIEF SUMMARY

An apparatus of notifying of parcel delivery is described. The apparatus includes an aerial parcel delivery apparatus, with landing gear, mechanically connected to the aerial parcel delivery apparatus. The apparatus includes a processing unit that collects, sends, and receives data. The apparatus includes a number of visual sensors that are mechanically connected to the aerial parcel delivery apparatus to provide a view an area near the aerial parcel delivery apparatus. The apparatus includes an articulated robotic arm including a protruding member. The robotic arm may comprise an end effector comprising one or more simulated fingers or digits of a human hand. The end effector may have the ability to grasp an object or actuate a doorbell, key pay, or an alarm system. The robotic arm may be configured to have telescoping, extendable units. The robotic arm including a protruding member causing an extension of force to ring a doorbell. The apparatus includes a wireless communication adapter, mechanically connected to the aerial parcel delivery apparatus. The wireless communication adapter sends and receives instructions to the number of visual sensors and the articulated robotic arm including a robotic arm including a protruding member.

A method for ringing a doorbell includes landing an aerial parcel delivery apparatus on landing gear, observing, using a visual sensor, an area near the aerial parcel delivery apparatus, identifying, within the area near the aerial parcel delivery apparatus, a doorbell, identifying a trajectory for a robotic arm including a protruding member, the trajectory being the path the robotic arm including a protruding member will use to press the doorbell; extending the robotic arm including a protruding member to press the doorbell; and monitoring, using an audio input device, for audio indicating the doorbell has rung.

BRIEF DESCRIPTION OF THE DRAWINGS

A more particular description of the invention briefly described above is made below by reference to specific example. Several examples are depicted in drawings included with this application. An example is presented to illustrate, but not restrict, the invention.

DETAILED DESCRIPTION

A detailed description of the claimed invention is provided below by example, with reference to examples in the appended figures. Those of skill in the art will recognize that the components and steps of the invention as described by example in the figures below could be arranged and designed in a wide variety of different configurations without departing from the substance of the claimed invention. Thus, the detailed description of the examples in the figures is merely representative examples of the invention, and is not intended to limit the scope of the invention as claimed.

For purposes of this disclosure, the modules refer to a combination of hardware and program instructions to perform a designated function. Each of the modules may include a processor and memory. The program instructions are stored in the memory, and cause the processor to execute the designated function of the modules. Additionally, a smartphone app and a corresponding computer system for the smartphone app may be used to control the access control.

A purpose of the claimed methods and computer program product is to facilitate the protection of a delivered parcel. In one example, the parcel recipient may be a retail consumer having a parcel delivered to the recipients dwelling. In a different example, a business may have a number of parcels delivered. A parcel may be a container that contains additional items or parcels.

For purposes of this disclosure as used in the present specification and in the appended claims the term "parcel" refers to a thing that is wrapped, packaged, or prepared for shipment. A parcel may be used to ship goods in a retail transaction or may be used to privately distribute a gift or goods.

As used in the present specification and in the appended, the term door means a particular device, system, or apparatus used to prevent passage past the device, system, or apparatus.

As used in the present specification and in the appended claims, the term doorbell means a system or apparatus for creating an alert signal that there may be an individual at the door. A doorbell includes an actuator button that is pressed by something at the door. The alert signal may be a bell sound, music, light, or other mechanisms of indicating the doorbell has been activated.

As used in the present specification and in the appended claims, the term "a number" refers to one or more of an item. Zero not being a number, but rather, the absence of a number.

As used in the present specification and in the appended, the term communication refers to the imparting or exchange of information.

As used in the present specification and in the appended, the term visual sensor refers to a device capable of storing an image, or a series of images, in view of the sensor of a device. A camera may create a digital image or series of images. A camera creating a series of images may store or communicate the series of images using a video format.

As described above, a myriad of problems complicate delivery of parcels to a location where the parcel may be left unattended. When the parcel is left unattended, the parcel may be stolen. The stolen parcel may be blamed on the delivery person, or may cause additional cost for a party who shipped the parcel. Additionally, the parcel may be left in place and vandalized, causing damage that could harm a parcel recipient, a parcel delivery agent, or a party who ships the parcel.

A parcel delivery notification apparatus allows an aerial parcel delivery apparatus to notify a building occupant of the delivery of a parcel when the building does not have specialized parcel delivery systems. A retailer may desire to notify a building occupant of parcel delivery to increase the chances the parcel will be retrieved and decrease the chances of a parcel being stolen or damaged.

Figure 1:
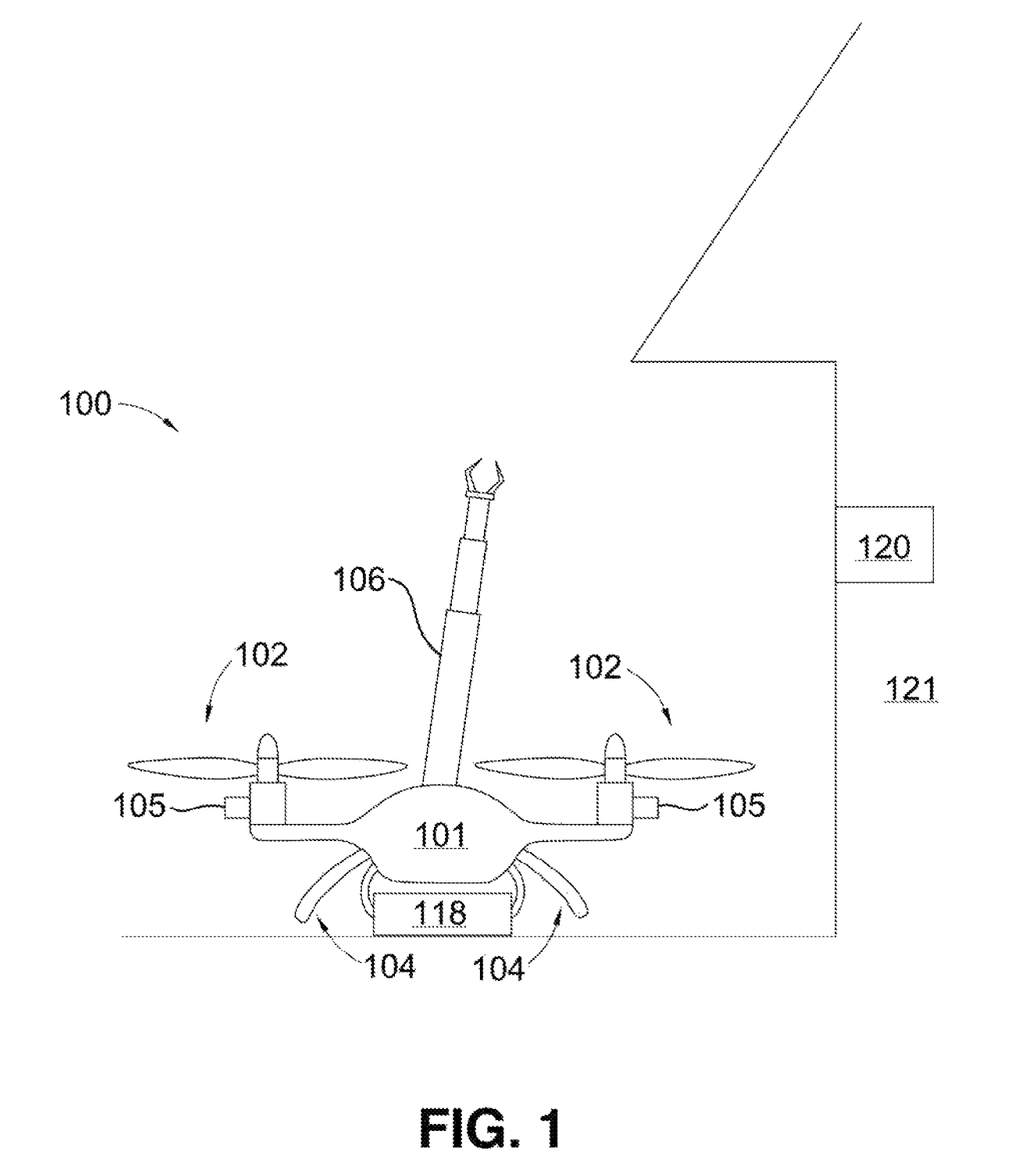
FIG. 1 illustrates a diagram of a use for an apparatus for notifying of a delivered parcel.

Referring now to the figures, FIG. 1 illustrates a diagram of a parcel delivery notification apparatus. As illustrated the parcel delivery notification apparatus (100) has an aerial parcel delivery apparatus (101) that has propellers (102) landing gear (104) and visual sensors (105). The parcel delivery notification apparatus (100) lands on the ground (116) near a building (121). The building (121) has a doorbell (120). When the doorbell (120) is pushed, occupants of the building (121) are notified that a person or thing is at the door. When the doorbell (120) is pushed, and occupant of may come to the door to investigate. A person at the door may notice a parcel (118) that has been delivered to the building (121).

The parcel delivery notification apparatus (100) lands near the building (121) and extends an articulated robotic arm that may comprise an end effector comprising one or more simulated fingers or digits of a human hand. The end effector may have the ability to grasp an object or actuate a doorbell, key pay, or an alarm system. The end effector may comprise a protruding member (106). The protruding member may extend towards the doorbell. When the articulated robotic arm including a protruding member (106) contacts the doorbell (120), a bell in the building (121) makes a sound to notify the occupants of the building (121) that someone, or something, is at the door.

Figure 2:
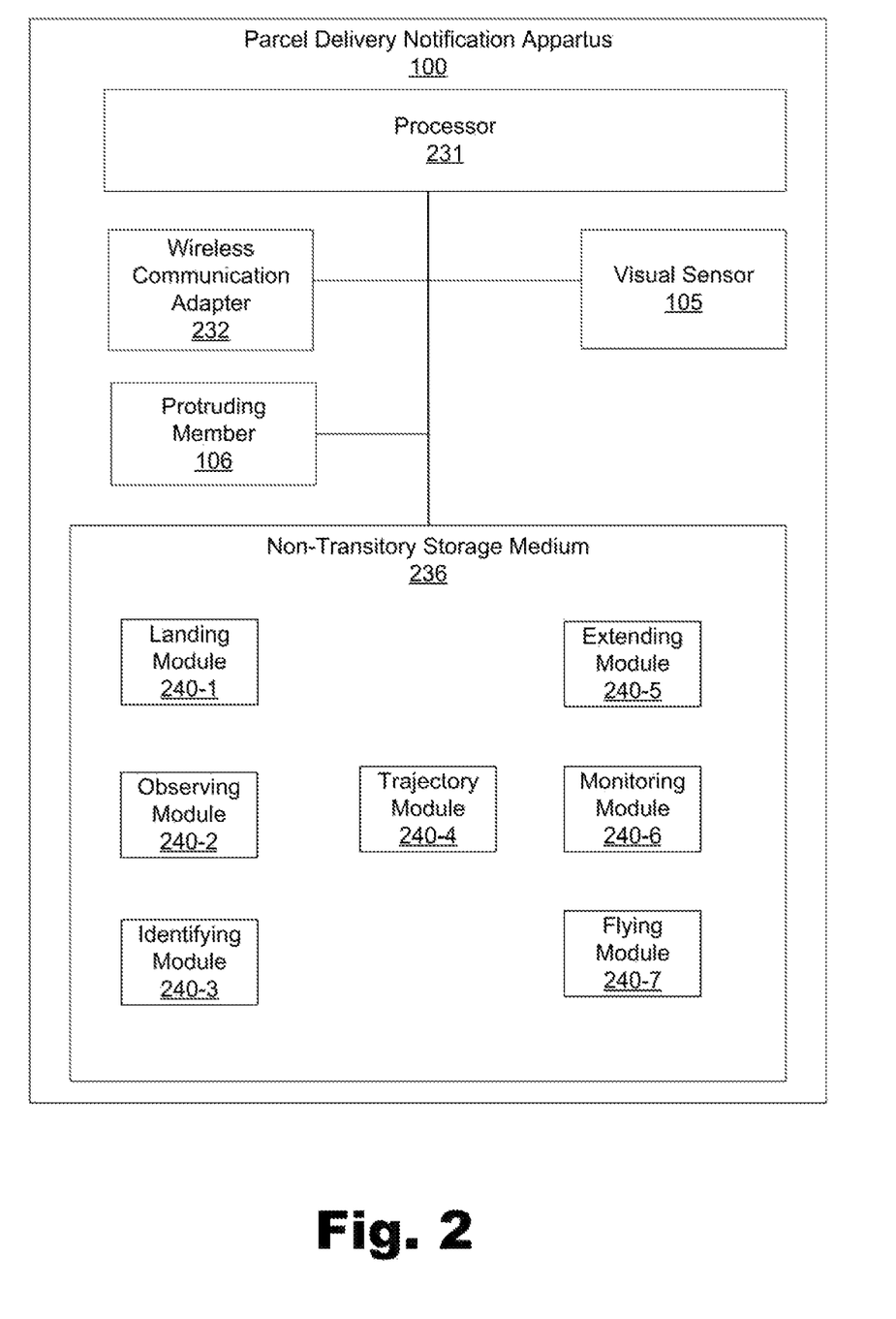
FIG. 2 illustrates a diagram of an apparatus for notifying of a parcel.

FIG. 2 illustrates a parcel delivery notification apparatus (100) according to one example of the principles described herein. The parcel delivery notification apparatus (100) includes a processor (231), a wireless communication adapter (232), a robotic arm including a protruding member (106), a visual sensor (105), and a non-transitory storage medium (236). The non-transitory storage medium (236) includes a number of modules (240). Each module includes software, hardware, or combination thereof to perform a specified task. In this example, the non-transitory storage medium (236) includes a Landing Module (240-1), Observing Module (240-2), Identifying Module (240-3), Trajectory Module (240-4), Extending Module (240-5), Monitoring Module (240-6), and Flying Module (240-7).

The landing module (240-1) causes the aerial parcel delivery apparatus (100) to land near a building (FIG. 1, 121) with a parcel (FIG. 1, 118). The aerial parcel delivery apparatus (100) may use a number of visual sensors (105) to identify the location of the building (FIG. 1, 121). The visual sensors (105) may use a combination of software and hardware to function as a proximity sensor. The proximity sensor may allow the aerial parcel delivery apparatus (100) to land on the ground (FIG. 1, 116) near the building (FIG. 1, 121) such that the aerial parcel delivery apparatus (100) may use the articulated robotic arm including a protruding member (106) to activate the doorbell (FIG. 1, 120). The articulated robotic arm may comprise an end effector comprising one or more simulated fingers or digits of a human hand. The end effector may have the ability to grasp an object or actuate a doorbell, key pay, or an alarm system. The aerial parcel delivery apparatus (100) may use the proximity sensor to maintain a distance from the building (FIG. 1, 121) In one example, the aerial parcel delivery apparatus (100) may land a 1 cm away from the building (FIG. 1, 121). In another example, the aerial parcel delivery apparatus (100) may land two meters from the building (FIG. 1, 121). In other examples, the aerial parcel delivery apparatus (100) may land at a distance between 1 centimeter and 5 meters. The aerial parcel delivery apparatus (100) may land further away than 5 meters. The Landing Module (240-1) may use a global positioning system. The Landing Module (240-1) may turn off a motor or propeller associated with the parcel delivery notification apparatus (100) when the parcel delivery notification apparatus lands.

The Observing Module (240-2) observes using a number of visual sensors, an area surrounding the aerial parcel delivery apparatus (100). The Observing Module (240-2) may observe obstacles and surroundings near the building (FIG. 1, 121). The Observing Module (240-2) may identify the location of parcel delivery based on a number of landmarks or features that are known to be present at the delivery location. The Observing Module (240-2) may observe in area including vertical and horizontal observations. The Observing Module (240-2) may receive location information over a wireless communication adapter (232) to identify the location, the building (FIG. 1, 121), the doorbell (FIG. 1, 120), or combination thereof. The location information may be used to determine the release of the parcel by the aerial parcel delivery apparatus.

The Identifying Module (240-3) identifies, within the area near the Aerial parcel delivery Apparatus (100), a doorbell (FIG. 1, 120). The Identifying Module (240-3) may identify a distance, vertical height, and angle from the articulated robotic arm including a protruding member comprising a protruding member, such as an end effector (106) associated with the Parcel Delivery Notification Apparatus (100). The distance, vertical height, and angle from the robotic arm including a protruding member (106) may be estimated prior to landing based on previously known information regarding the delivery location.

The Trajectory Module (240-4) identifies a trajectory for the robotic arm including a protruding member (106). The trajectory is the path the robotic arm including a protruding member (106) will use to press the doorbell (FIG. 1, 120). The Trajectory Module (240-4) may consider obstacles in the trajectory to calculate the trajectory. The Trajectory Module (240-4) may consider attributes of the robotic arm including a protruding member (106) to calculate the trajectory. The Trajectory Module (240-4) may use data collected from the number of visual sensors (105). The Trajectory Module (240-4) may receive a signal from the doorbell (FIG. 1, 120) identifying the location of the doorbell.

The Extending Module (240-5) extends the robotic arm including a protruding member (106) to press the doorbell (FIG. 1, 120). The Extending Module (240-5) may extend the protruding member (106) by expelling force from the robotic arm including a protruding member (106). The force may include a projectile or gas with sufficient force to press the doorbell (FIG. 1, 120).

The Monitoring Module (240-6) may monitor that the doorbell issued an alert. The Monitoring Module (240-6) may use audio sensors to listen for a belt or chime indicating that the doorbell has functioned correctly. The Monitoring Module (240-6) may receive a radio signal from the doorbell (FIG. 1, 120) indicating that the doorbell has been activated. The Monitoring Module (240-6) may use visual sensors (105) to detect a fluctuation of light levels indicating that the doorbell (FIG. 1, 120) has been activated.

The Flying Module (240-7) may cause the flying parcel notification apparatus (100) to depart the area. The Flying Module (210-7) may turn on a motor or number of motors to cause the flying parcel notification apparatus (100) to fly. The flying parcel notification apparatus (100) may return to an origin of the parcel (FIG. 1, 118).

Figure 3:
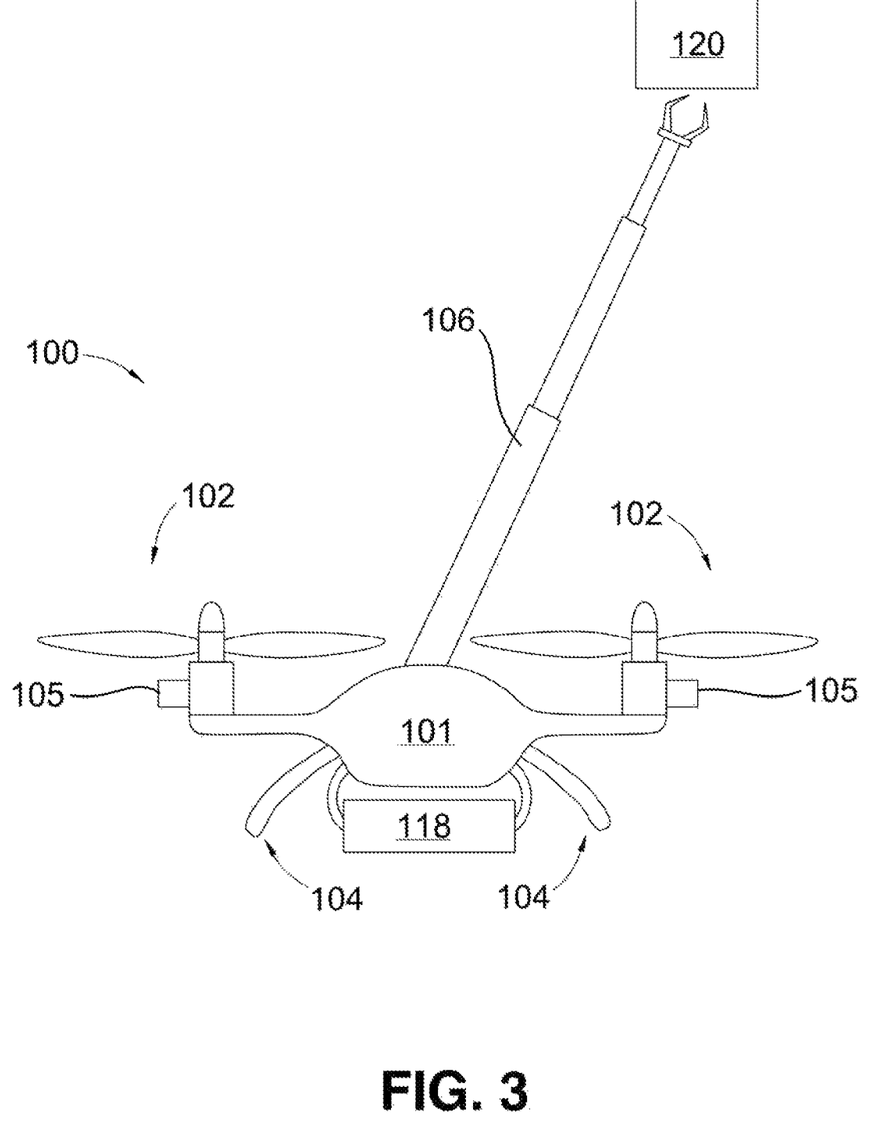
FIG. 3 illustrates an diagram of an apparatus with an articulated robotic arm including a protruding member

FIG. 3 illustrates a parcel delivery notification apparatus (100) notifying occupants of the building (FIG. 1, 121) that a parcel (118) has been delivered. In this example, the parcel delivery notification apparatus (110) extends the protruding member (106) to achieve mechanical contact with the doorbell (120).

An overall example according to FIG. 3 will now be given. The parcel delivery notification apparatus (100) uses the Landing Module (FIG. 1, 240-1) to land the parcel delivery notification apparatus in proximity to the building (FIG. 1, 121).

The parcel delivery notification apparatus (100) uses the Observing Module (FIG. 2, 240-2) to observe using a number of visual sensors (105) the area between the parcel delivery notification apparatus (100) and the building (FIG. 1, 121).

The Identifying Module (FIG. 2, 240-3) examines the data from the number of visual sensors (105) and identifies a doorbell. The doorbell is used as a target for a trajectory.

The Trajectory Module (FIG. 2, 240-4) identifies a trajectory, or path, that will be used by the robotic arm including a protruding member to actuate the doorbell (120). The Trajectory Module (FIG. 2, 240-4) identifies a trajectory that will not encounter obstacles in extending the protruding member (106).

The Extending Module (FIG. 2, 240-5) extends the protruding member (106) to actuate the doorbell (120). The Extending Module (FIG. 2, 240-5) engages a number of electric motors to extend the protruding member of the robotic arm in a telescoping fashion.

After the protruding member (106) is extended, the Monitoring Module (FIG. 2, 240-6) monitors for an alert given by the doorbell (120). In this example, the Monitoring Module (FIG. 2, 240-6) uses a number of audio sensors to detect a bell sound made by the doorbell (120).

The Flying Module (FIG. 2, 240-7) engages a number of engines to cause the parcel delivery notification apparatus (100) to resume flying and directs the parcel delivery notification apparatus (100) to another destination.

Figure 4:
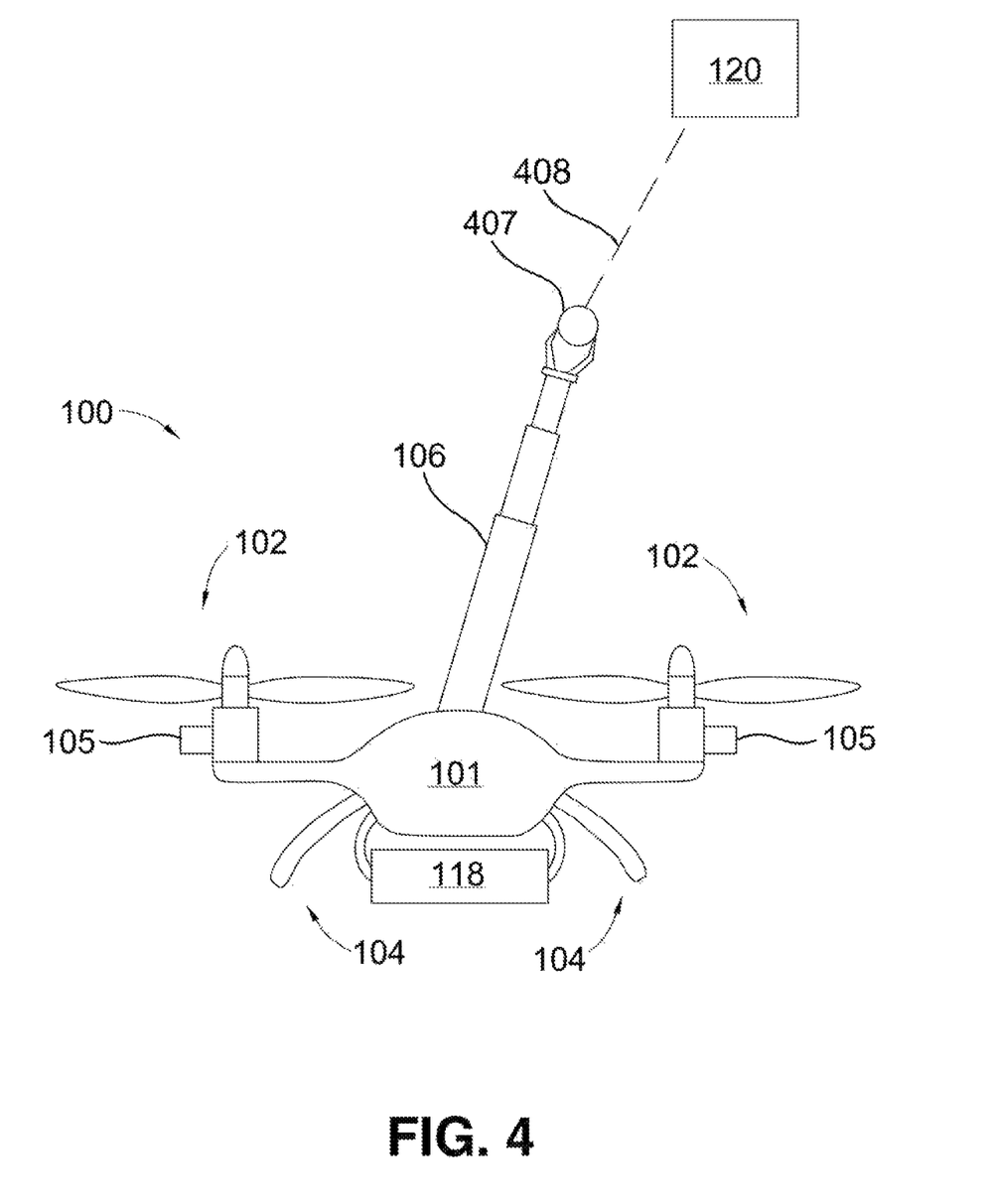
FIG. 4 illustrates a diagram of an apparatus that uses force with an articulated robotic arm including a protruding member.

FIG. 4 illustrates a parcel delivery notification apparatus (100) where the protruding member (106) uses a projectile (407) traveling along the trajectory (408) to contact the doorbell (120). An example using FIG. 4 will now be given.

The parcel delivery notification apparatus (100) uses the Landing Module (FIG. 2, 240-1), Observing Module (240-2), and Identifying Module (240-3) operate as in FIG. 3.

The Trajectory Module (FIG. 2, 240-4) calculates a trajectory (408) for a projectile (407). The projectile (407) is propelled from the robotic arm including a protruding member (106) of the parcel delivery notification apparatus (100). The Trajectory Module (FIG. 2, 240-4) may consider the ballistic characteristics of the projectile (407). The Trajectory Module (FIG. 2, 240-4) may consider weather conditions, such as wind, rain, and snow to calculate a projected trajectory. The Trajectory Module (FIG. 2, 240-2) may vary the energy used to propel the projectile (407). In some examples, the projectile (407) may be biodegradable. A biodegradable projectile (407) may be left with the parcel (118). In other examples, instead of a tangible projectile (407) a force such as a blast of air or CO2 or other gas is used. The gas may be a compressed gas. In still other examples, the projectile (407) may be retrieved by the parcel delivery notification apparatus (100).

In this example, the Extending Module (FIG. 2, 240-5) uses a blast of air to propel a projectile made of compressed cornstarch that is biodegradable. The Extending Module (FIG. 2, 240-5) shoots the projectile (407) from the protruding member (106) to strike the doorbell (120). The projectile (407) travels along the trajectory (408) to strike the doorbell (120).

The Monitoring Module (FIG. 2, 240-6) and Flying Module (FIG. 2, 240-7) perform as described above in FIG. 3.

Figure 5:
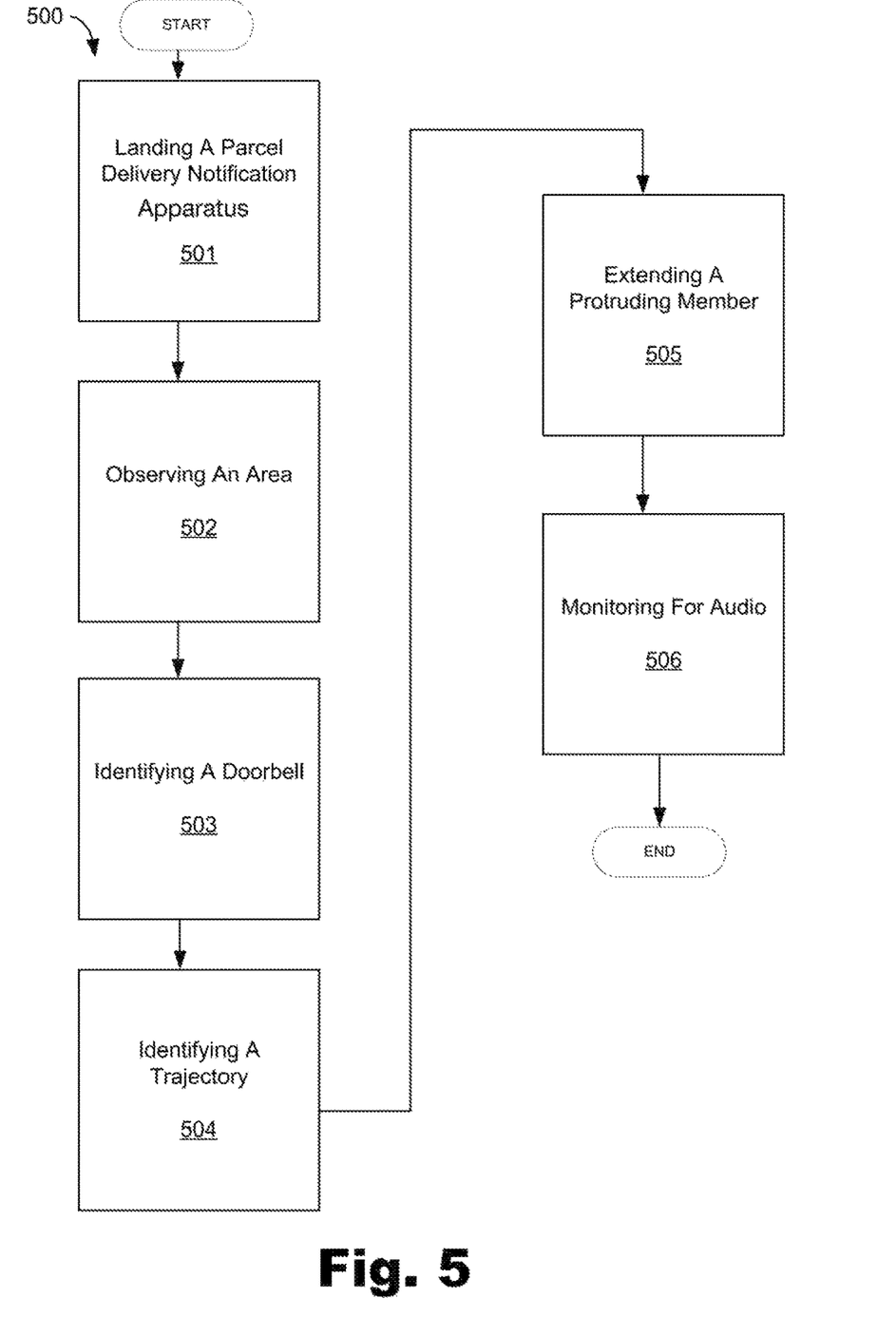
FIG. 5 illustrates a method for protecting a delivered parcel.

FIG. 5 illustrates a method (500) for ringing a doorbell to provide notification of parcel delivery. The method (500) includes landing (501) a parcel delivery notification apparatus on landing gear. The method (500) includes observing (502), using a number of visual sensors, an area near the parcel delivery notification apparatus. The method (500) includes identifying (503), within the area near the parcel delivery notification apparatus, a doorbell. The method (500) includes identifying (504) a trajectory for a robotic arm including a protruding member. The trajectory is a path the robotic arm including a protruding member will use to press the doorbell. The method (500) includes extending (505) the robotic arm with a protruding member to press the doorbell. The method (500) includes monitoring (506), using an audio input device, for audio indicating the doorbell has rung.

The method (500) includes landing (501) a parcel delivery notification apparatus on landing gear. The landing (501) may be controlled by a remote control server. The landing may include a number of sensors providing measurements of the area around the parcel delivery notification apparatus. The landing (501) may use a proximity sensor. The proximity sensor may maintain a distance range from the doorbell or building. The landing (501) may use a global positioning system to identify the location of the parcel delivery notification apparatus.

The method (500) includes observing (502), using a number of visual sensors, an area near the aerial parcel delivery apparatus. The number of visual sensors may include any of a camera, a night vision camera, an illumination device, or a proximity sensor.

The method (500) includes identifying (503), within the area near the aerial parcel delivery apparatus, a doorbell. Identifying (503) the doorbell may examine characteristics of an image taken by the visual sensors. Identifying (503) the doorbell may use wireless technology to identify the location of the doorbell. Identifying (503) the doorbell may also confirm the location of the parcel delivery notification apparatus to determine that the release of the parcel by the parcel delivery notification apparatus is approved.

The method (500) includes identifying (504) a trajectory for a robotic arm including a protruding member. The trajectory is a path the robotic arm including a protruding member will use to actuate the doorbell. Identifying (504) the trajectory may calculate a trajectory based on a number of obstacles between the aerial parcel delivery apparatus and the doorbell.

The method (500) includes extending (505) the articulated robotic arm comprising an end effector comprising one or more simulated fingers or digits of a human hand. The end effector may have the ability to grasp an object or actuate a doorbell, key pay, or an alarm system. The extended protruding member may press the doorbell. Extending (505) the articulated robotic arm including a protruding member may mechanically extend the robotic arm including a protruding member to contact the doorbell. Extending (505) the robotic arm including a protruding member may cause a gaseous force or projectile to leave the robotic arm including a protruding member to actuate an actuator button on the doorbell.

The method (500) includes monitoring (506), using an audio input device, for audio indicating the doorbell has rung. An audio input device may listen for a town produced by the doorbell indicating that the robotic arm including a protruding member successfully contacted the actuator button on the doorbell.

Figure 6:
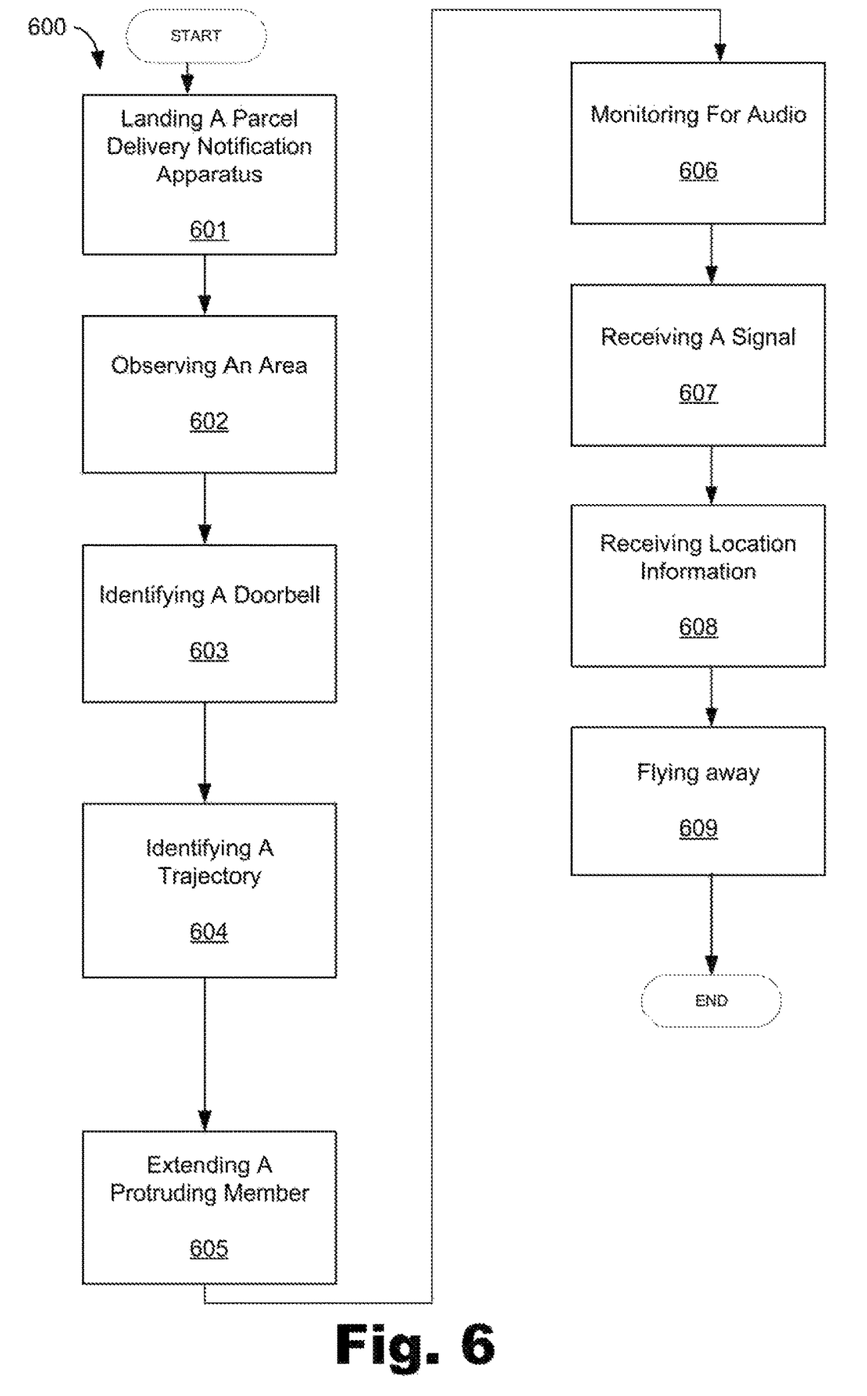
FIG. 6 illustrates a method for protecting a delivered parcel.

FIG. 6 illustrates a method (600) for ringing a doorbell to provide notification of parcel delivery. The method (600) includes landing (601) an aerial parcel delivery apparatus on landing gear. The method (600) includes observing (602), using a number of visual sensors, an area near the aerial parcel delivery apparatus. The method (600) includes identifying (603), within the area near the aerial parcel delivery apparatus, a doorbell. The method (600) includes identifying (604) a trajectory for a protruding member of a robotic arm. The trajectory is a path the robotic arm including a protruding member may use to press the doorbell. The method (600) includes extending (605) the robotic arm including a protruding member to press the doorbell. The method (600) includes monitoring (606), using an audio input device, for audio indicating the doorbell has rung. The method (600) includes receiving (607), from the doorbell, a signal. The method (600) includes receiving (608) location information over a while wireless communication adapter to confirm the location of the parcel delivery notification apparatus. The method (600) includes flying (609) the parcel delivery notification apparatus away from the doorbell.

As described above, the method (600) identifying (603), within the area near the aerial parcel delivery apparatus, a doorbell. The method (600) includes identifying (604) a trajectory for a robotic arm including a protruding member. The trajectory is a path the robotic arm including a protruding member will use to press the doorbell. The method (600) includes extending (605) the protruding member of the robotic arm to press the doorbell. The method (600) includes monitoring (606), using an audio input device, for audio indicating the doorbell has rung.

The method (600) includes receiving (607), from the doorbell, a signal. A doorbell may, for example, emit a radio frequency indicating that the doorbell has been activated. The parcel delivery notification apparatus may receive the radio signal to confirm that the occupants of the building have been notified of the arrival of the parcel.

The method (600) includes receiving (608) location information over a while wireless communication adapter to confirm the location of the parcel delivery notification apparatus. Location information may be received from a server calculating the location of the parcel delivery notification apparatus based on data read from the visual sensors, auditory sensors, proximity sensors, radio sensors, or global positioning system, or any combination of sensors. The location information may be used to calculate the trajectory to be used by the robotic arm including a protruding member. The location information may be used to confirm the intent to release the parcel.

The method (600) includes flying (609) the parcel delivery notification apparatus away from the doorbell. The parcel delivery notification apparatus may proceed to deliver a different parcel. The parcel delivery notification apparatus may proceed to a location to obtain another parcel to deliver. The parcel delivery notification apparatus may return to an owner or operator to complete operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. An aerial parcel delivery apparatus, comprising:
   landing gear, mechanically connected to the aerial parcel delivery apparatus;
   an audio sensor;
   a visual sensor, mechanically connected to the aerial parcel delivery apparatus;
   a projectile;
   an articulated robotic arm that is configured to propel the projectile to actuate a doorbell;
   a processor and;
   a memory in electronic communication with the processor, the memory storing instructions that when executed by the processor cause the processor to:
      land the aerial parcel delivery apparatus to meet a particular distance requirement from the doorbell;
      identify at least one of a distance, a vertical height, and an angle from the articulated robotic arm to the doorbell based at least in part on visual information from the visual sensor;
      identify a trajectory for the projectile to actuate the doorbell based on the at least one of the distance, the vertical height, and the angle from the articulated robotic arm to the doorbell;
      determine an energy to use to propel the projectile based on the identified trajectory to actuate the doorbell;
      propel the projectile, by the articulated robotic arm, to actuate the doorbell based on the trajectory and the energy; and
      monitor for audio information from the audio sensor indicating that the doorbell has been activated.

2. The apparatus of claim 1, wherein the visual sensor comprises a camera.

3. The apparatus of claim 1, wherein the articulated robotic arm extends to propel the projectile.

4. The apparatus of claim 1, wherein the articulated robotic arm expels a gas to propel the projectile.

5. The apparatus of claim 4, wherein the gas is compressed carbon dioxide.

6. The apparatus of claim 4, wherein the gas is air.

7. The apparatus of claim 1, wherein the projectile is biodegradable.

8. The apparatus of claim 1, wherein the instructions are further executable by the processor to analyze readings from the visual sensor to identify the doorbell.

9. A method, by an aerial parcel delivery robot, for ringing a doorbell, the method comprising:
- landing the aerial parcel delivery robot to meet a particular distance requirement from to the doorbell;
- identifying at least one of a distance, a vertical height, and an angle from an articulated robotic arm to the doorbell;
- identifying a trajectory for a projectile to actuate the doorbell based on the at least one of the distance, the vertical height, and the angle from the articulated robotic arm to the doorbell;
- determining an energy to use to propel the projectile based on the identified trajectory to actuate the doorbell;
- propelling the projectile, by the articulated robotic arm, to actuate the doorbell based on the trajectory and the energy; and
- monitoring, using an audio sensor, for audio information indicating that the doorbell has been activated.

10. The method of claim 9, wherein landing the aerial parcel delivery robot to meet the particular distance requirement from the doorbell comprises using a proximity sensor to land at a site within a distance range of the doorbell, such that the articulated robotic arm may actuate the doorbell.

11. The method of claim 10, wherein the distance range is between 1 centimeter and 5 meters.

12. The method of claim 9, wherein landing the aerial parcel delivery robot to meet the particular distance requirement from the doorbell comprises using a global positioning system to identify a landing location.

13. The method of claim 9, wherein landing the aerial parcel delivery robot to meet the particular distance requirement from the doorbell comprises turning off a motor that causes the aerial parcel delivery robot to fly.

14. The method of claim 9, further comprising flying the aerial parcel delivery robot away from the doorbell.

15. The method of claim 9, further comprising monitoring for a radio signal from the doorbell indicating that the doorbell has been activated.

16. The method of claim 9, further comprising receiving, from the doorbell, a signal, the signal providing identification information to identify the doorbell.

17. The method of claim 9, further comprising receiving location information over a wireless communication device to confirm a landing location of the aerial parcel delivery robot.

18. The method of claim 17, wherein the location information is used to determine a release of a parcel by the aerial parcel delivery robot.

* * * * *